(12) United States Patent  
Yoshikawa et al.

(10) Patent No.: US 8,877,406 B2  
(45) Date of Patent: Nov. 4, 2014

(54) FUEL CELL, AND METHOD OF MANUFACTURING A FUEL CELL

(75) Inventors: Hiroo Yoshikawa, Toyota (JP); Junji Nakanishi, Kasugai (JP); Akito Kawasumi, Toyota (JP); Tsunemasa Nishida, Toyota (JP); Kenji Tsubosaka, Susono (JP); Takeaki Saito, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/703,578

(22) PCT Filed: Jun. 15, 2010

(86) PCT No.: PCT/JP2010/003973  
§ 371 (c)(1),  
(2), (4) Date: Dec. 11, 2012

(87) PCT Pub. No.: WO2011/158286  
PCT Pub. Date: Dec. 22, 2011

(65) Prior Publication Data  
US 2013/0089808 A1    Apr. 11, 2013

(51) Int. Cl.  
*H01M 8/10* (2006.01)  
*H01M 8/02* (2006.01)

(52) U.S. Cl.  
CPC ............ *H01M 8/0276* (2013.01); *Y02E 60/521* (2013.01); *H01M 8/0286* (2013.01); *H01M 8/0247* (2013.01); *H01M 8/028* (2013.01); *H01M 8/0284* (2013.01); *H01M 8/1065* (2013.01); *H01M 2008/1095* (2013.01)  
USPC .......................................... 429/490; 429/535

(58) Field of Classification Search  
CPC ............... H01M 2008/1095; H01M 8/241; H01M 8/0273; H01M 8/0276; H01M 8/0286  
USPC .................................................. 429/490, 535  
See application file for complete search history.

(56) References Cited

U.S. PATENT DOCUMENTS

| | | |
|---|---|---|
| 2005/0164064 A1 | 7/2005 | Cho et al. |
| 2006/0142039 A1 | 6/2006 | Debe et al. |

(Continued)

FOREIGN PATENT DOCUMENTS

| | | |
|---|---|---|
| CN | 1674339 A | 9/2005 |
| CN | 101529630 A | 9/2009 |

(Continued)

OTHER PUBLICATIONS

English Translation of JP-2005019057A.*

*Primary Examiner* — Stewart Fraser  
(74) *Attorney, Agent, or Firm* — Sughrue Mion, PLLC

(57) ABSTRACT

A fuel cell includes a separator and a power generating body. The separator and power generating body are laminated each other. The power generating body is equipped at least with an electrolyte membrane. The fuel cell comprises: a sealing part that seals reaction gas supplied for electrochemical reactions at the fuel cell between the power generating body and the separator at an outer circumference part of the fuel cell, wherein a convex part and a recess are fit together in the sealing part. The convex part is formed projecting in the lamination direction on one of the power generating body and the separator, and the recess is formed recessed in the lamination direction on the other of the power generating body and the separator. At least one of the convex part and the recess is formed with a polymer material that expands with moisture absorption.

16 Claims, 11 Drawing Sheets

(56) References Cited

U.S. PATENT DOCUMENTS

2009/0280391 A1    11/2009  Chang et al.
2010/0099004 A1*   4/2010  Nomoto .................. 429/34

FOREIGN PATENT DOCUMENTS

| | | |
|---|---|---|
| JP | 04-264367 A | 9/1992 |
| JP | 09-167623 A | 6/1997 |
| JP | 10-261423 A | 9/1998 |
| JP | 2003-017093 A | 1/2003 |
| JP | 2005-019057 A | 1/2005 |
| JP | 2005019057 A * | 1/2005 |
| JP | 2005-183221 A | 7/2005 |
| JP | 2008-034383 A | 2/2008 |
| JP | 2008-152943 A | 7/2008 |
| JP | 2008-525986 A | 7/2008 |
| JP | 2008-235159 A | 10/2008 |
| JP | 2009-016067 A | 1/2009 |
| JP | 2009-272287 A | 11/2009 |

* cited by examiner

Fig.1
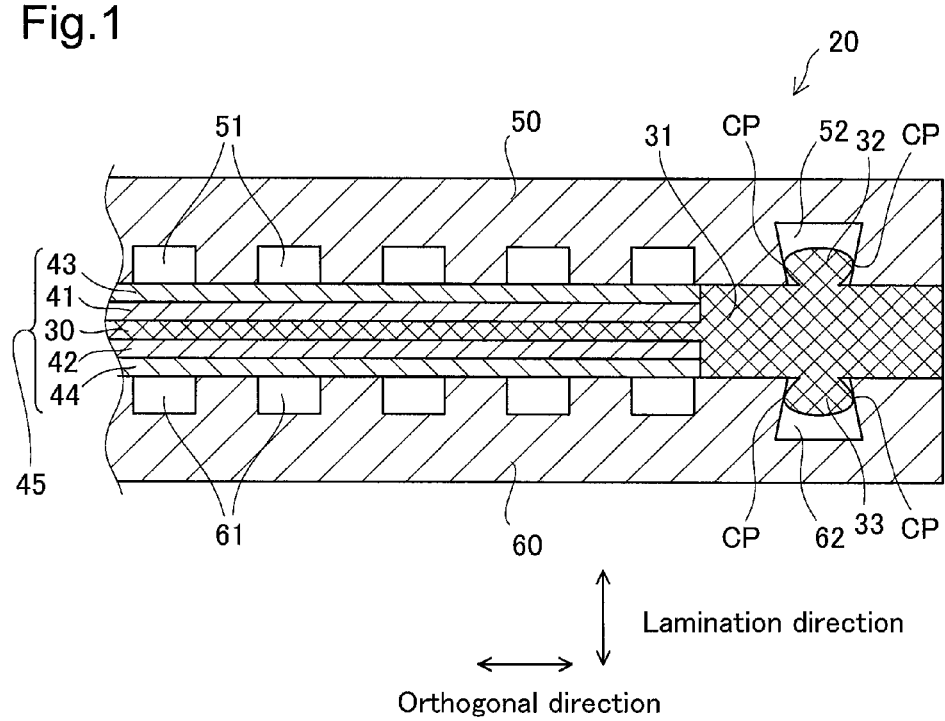
Lamination direction
Orthogonal direction
Fig.2
Fig. 2A
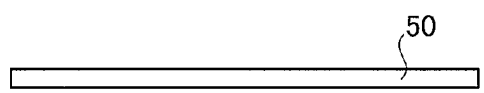
Fig. 2B
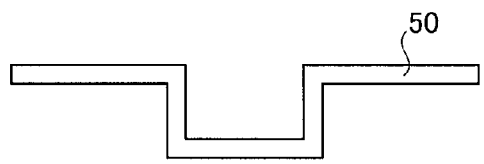
Fig. 2C
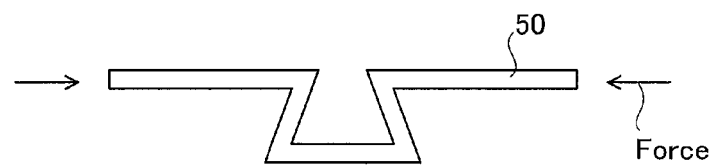
Force

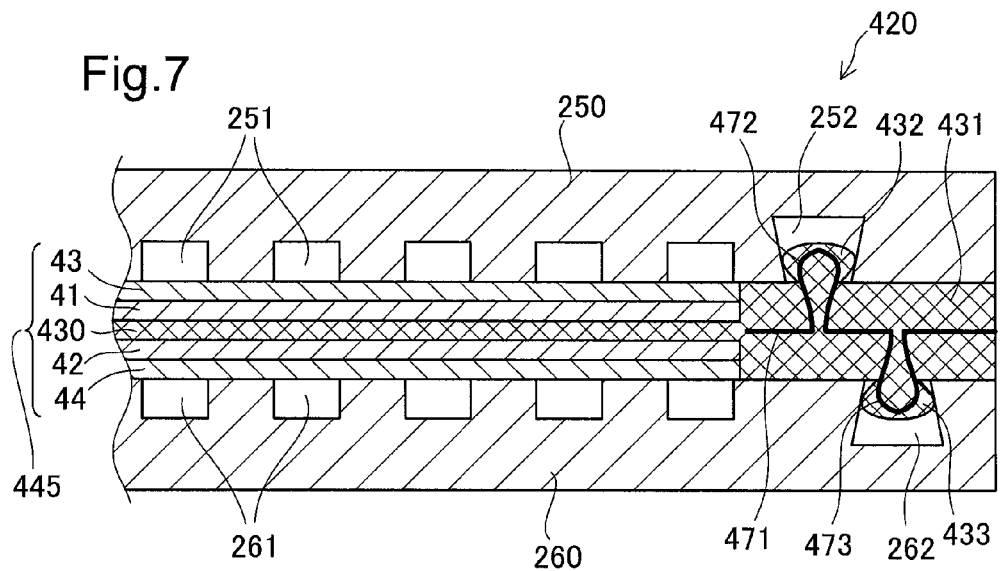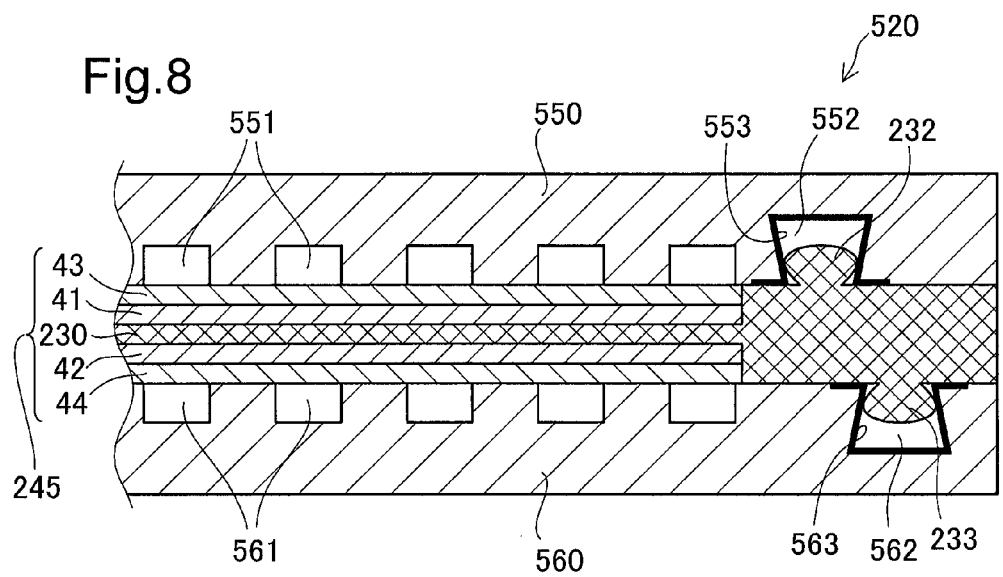

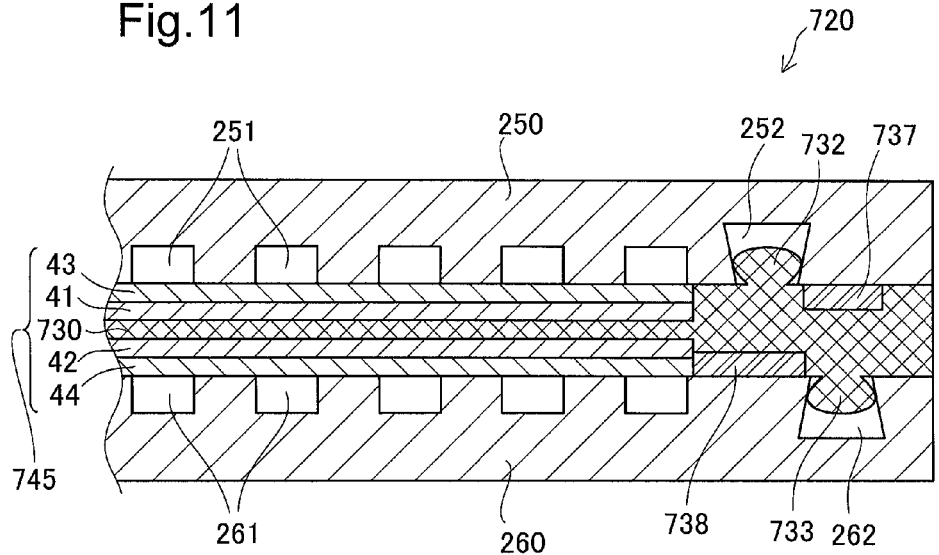
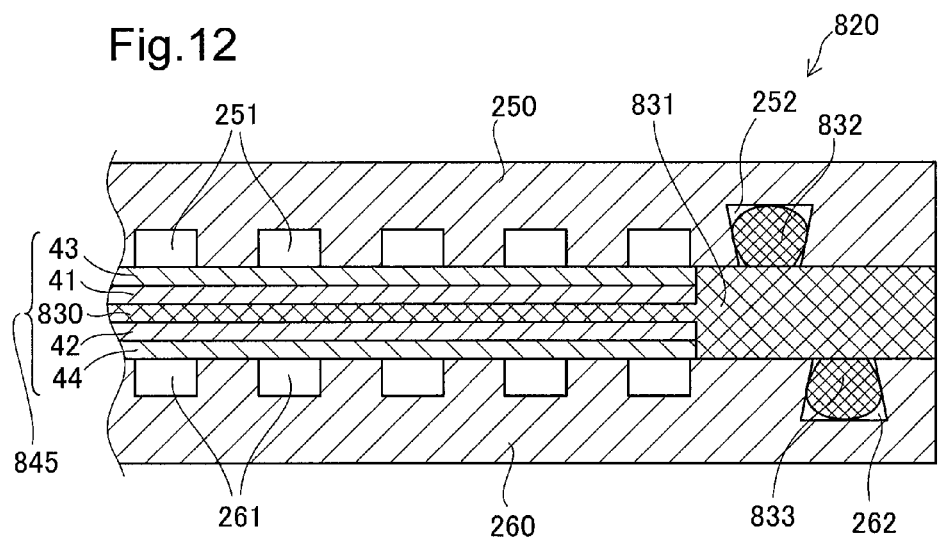

FUEL CELL, AND METHOD OF MANUFACTURING A FUEL CELL

CROSS REFERENCE TO RELATED APPLICATIONS

This application is a National Stage of International Application No. PCT/JP2010/003973, filed on Jun. 15, 2010, the contents of all of which are incorporated herein by reference in their entirety.

BACKGROUND

1. Technical Field

The present invention relates to fuel cell sealing technology.

2. Background Art

A fuel cell is constituted, for example, by forming a gas diffusion layer on both surfaces of a membrane electrode assembly, and by sandwiching both of those ends with separators. With this type of fuel cell, various technologies have been developed for sealing the reaction gas supplied for fuel cell reactions with the membrane electrode assembly. For example, with Patent Document 1 noted below, disclosed is a fuel cell having a constitution for which at the circumference edge part between two facing separators, a sealing member is provided between the two separators, and the sealing member and separators are fit together. With this constitution, it is possible to suppress changes in sealing pressure due to variation in the size of the sealing member, and to improve the sealing performance.

However, with the technology of PTL1, to ensure sufficient sealing performance, a prerequisite was to clamp the fuel cell in the sandwiching direction with a relatively high clamp load. With the structural members of the fuel cell, it was necessary to have rigidity in accordance with the clamp load, so when the clamp load becomes high, this can lead to higher cost and larger size and the like of the fuel cell. Therefore, there was room for improvement regarding reduction of the clamp load.

CITATION LIST

Patent Literature

[PTL1] Unexamined Patent Publication No. 2005-183221
[PTL2] Unexamined Patent Publication No. 2008-235159
[PTL3] Unexamined Patent Publication No. 2008-34383
[PTL4] Unexamined Patent Publication No. 2003-17093
[PTL5] Unexamined Patent Publication No. 2008-152943
[PTL6] Translation of Patent Application Publication No. 2008-525986
[PTL7] Unexamined Patent Publication No. 2005-19057

SUMMARY OF INVENTION

Technical Problem

Taking into consideration the problems described above, an object to be solved by the present invention is to reduce the clamp load of a fuel cell.

Solution to Problem

The present invention was created to address at least a portion of the problems described above, and can be realized as the following modes or application examples.

Application Example 1

A fuel cell including a separator and a power generating body, the separator and power generating body being laminated each other, and the power generating body being equipped at least with an electrolyte membrane, anode and cathode, comprising:
a sealing part that seals reaction gas supplied for electrochemical reactions at the fuel cell between the power generating body and the separator at an outer circumference part of the fuel cell, wherein a convex part and a recess are fit together in the sealing part, the convex part being formed projecting in the lamination direction on one of the power generating body and the separator, and the recess being formed recessed in the lamination direction on the other of the power generating body and the separator, and
at least one of the convex part and the recess is formed with a polymer material that expands with moisture absorption.

With the fuel cell of this constitution, at least one of the recess and the convex part for sealing the reaction gas is formed with a polymer material that expands due to moisture absorption. Accordingly, the polymer material expands with generated water or the like generated along with operation of the fuel cell. Therefore, the adhesive property of the recess and the convex part increases, making it possible to improve the sealing properties. As a result, it is possible to reduce the clamp load in the fuel cell lamination direction required to ensure the sealing properties.

Application Example 2

A fuel cell according to Application Example 1 wherein the convex part and the recess perform the sealing by contacting at least in a direction intersecting with the lamination direction.

The fuel cell of this constitution performs sealing in the direction intersecting the lamination direction. Accordingly, a large clamp load is not required to ensure sealing properties. Specifically, it is possible to reduce the clamp load.

Application Example 3

A fuel cell according to Application Example 2 having a gap between a projecting tip of the convex part and a recessed bottom surface of the recess in a state for which the at least one of the convex part and the recess formed using the polymer material has expanded due to moisture absorption.

The fuel cell of this constitution has a gap between the projecting tip of the convex part and the recessed bottom surface of the recess in a state for which at least one of the convex part and the recess has expanded due to moisture absorption. Therefore, the tip of the convex part does not contact the bottom surface of the recess along with expansion of the polymer material, and there is no generation of reaction force in the direction for which the recess and concave part fitting relationship would be eliminated. Therefore, the clamp load for suppressing deformation in the fuel cell lamination direction due to expansion of the polymer material is no longer necessary, making it possible to reduce the clamp load.

Application Example 4

A fuel cell according to any of Application Examples 1 through 3 wherein the convex part has a shape such that at least a part of the convex part further to a tip side has a cross section area in a direction intersecting the lamination direction which is larger than that of a base of the projection of the convex part, and at least a part of the recess further to an inside has an opening cross section area which is larger than that of an opening part of the recess.

With the fuel cell of this constitution, the recess and concave part fitting relationship is not eliminated easily. Accordingly, it is possible to reduce the clamp load of the fuel cell.

Application Example 5

A fuel cell according to any of Application Examples 1 through 4 wherein the convex part is formed on the power generating body, and the recess is formed on the separator.

With the fuel cell of this constitution, the convex part is formed on the power generating body for which the lamination direction thickness is relatively thin, and the recess is formed on the separator for which that thickness is relatively thick. Accordingly, forming of the recess is performed easily.

Application Example 6

A fuel cell according to Application Example 5 wherein the convex part is formed using a polymer material.

With the fuel cell of this constitution, the convex part can be formed on a roughly flat power generating body. Accordingly, manufacturing is easier than when forming the recess with a polymer material.

Application Example 7

A fuel cell according to Application Example 6 wherein the polymer material is an electrolyte, and the convex part is formed as an integral unit with the electrolyte membrane using the electrolyte.

With the fuel cell of this constitution, it is possible to share materials between the electrolyte membrane and the polymer material. Accordingly, it is possible to reduce the number of parts. Moreover, it is possible to form the convex part as an integral unit with the electrolyte membrane using an electrolyte. Consequently, it is easy for the generated water that is generated along with operation of the fuel cell to reach the convex part formed with the polymer material. As a result, it is possible to reliably expand the convex part with moisture absorption and to ensure sufficient sealing properties.

Application Example 8

A fuel cell according to Application Example 6 or 7 further comprising: an internal member in the convex part, the internal member having an elasticity smaller than that of the polymer material and a shape roughly follows a shape of the convex part.

With the fuel cell of this constitution, the shape of the convex part does not deform easily for long term use of the fuel cell. Accordingly, durability is improved.

Application Example 9

A fuel cell according to Application Example 8 wherein the internal member is formed with a shape memory member.

With the fuel cell of this constitution, it is possible to change the shape of the internal member by temperature. Accordingly, it is possible to realize a convex part of a shape that is suited to differences in the location during manufacturing, operation or the like of the fuel cell.

Application Example 10

A fuel cell according to any of Application Examples 6 through 9 wherein a shape memory member is joined to a side surface of an inner diameter of the recess of the separator.

With the fuel cell of this constitution, it is possible to change the shape of the shape memory member by temperature. Accordingly, it is possible to realize a recess of a shape that is suited to differences in the location during manufacturing, operation or the like of the fuel cell.

Application Example 11

A fuel cell according to any of Application Examples 5 through 10 wherein the separator on which recess is formed is a pair of separators laminated on both surfaces of the power generating body, at least one of the pair of separators is equipped with a projecting part at a position corresponding to the recess formed on the other separator, the projecting part projecting facing the recess and the projecting part seals the reaction gas between the one of the separators and the power generating body.

With the fuel cell of this constitution, in addition to the seal between the recess of the separator and the convex part of the power generating body, it is possible to also perform sealing between the projecting part of at least one separator and the power generating body. In other words, it is possible to perform sealing at two locations. Therefore, it is possible to improve the sealing properties. Alternatively, it is possible to improve the seal reliability.

Application Example 12

A fuel cell according to any of Application Examples 6 through 10 further comprising: a support member with elasticity smaller than that of the polymer material in the convex part.

With the fuel cell of this constitution, it is possible to improve the strength of the convex part.

Application Example 13

A fuel cell according to Application Example 7 further comprising: a support member with elasticity smaller than that of the polymer material, the support member being arranged at a position at which the convex part is formed, and inside the electrolyte membrane or at a surface opposite a surface on which the convex part of the electrolyte membrane is formed.

With the fuel cell of this constitution, it is possible to improve the strength of the convex part.

Application Example 14

A fuel cell according to any of Application Examples 1 through 13 wherein mutually fitting screw grooves are formed on a side surface of the convex part and a side surface of the recess.

With the fuel cell of this constitution, the convex part and the recess are fit together by a screw structure. Accordingly, the fitting relationship is stronger, and the sealing properties are improved. Moreover, the fitting relationship of the convex part and the recess is not eliminated easily. Consequently, it is possible to improve the reliability of the seal.

Application Example 15

A fuel cell according to any of Application Examples 1 through 14 wherein the convex parts or the recesses are formed at both surfaces of the power generating body, the convex parts or the recesses that fit with the recesses or the convex parts are formed at both of the separators laminated at both sides of the power generating body, and the convex parts or the recesses of the power generating body are formed at a different positions between both surfaces of that power generating body.

With the fuel cell of this constitution, the convex parts or the recesses formed on the power generating body are formed at a different positions between both surfaces. Accordingly, it is easy to distinguish the front and back of the power generating body.

Application Example 16

A fuel cell according to any of Application Examples 1 through 5, wherein the polymer material is electrolyte.

With the fuel cell of this constitution, it is possible to share materials between the electrolyte membrane and the polymer material. Accordingly, it is possible to reduce the number of parts.

Application Example 17

A method of manufacturing a fuel cell including a separator and a power generating body, the separator and power generating body being laminated each other, and the power generating body being equipped at least with an electrolyte membrane, comprising: a first step of preparing the power generating body having an outer circumference part formed only by the electrolyte membrane, and the separator having a recess that is recessed in relation to the laminated surface on an outer circumference part of the separator, a second step of laminating the power generating body and the separator in a positional relationship for which the outer circumference part of the power generating body and the recess face opposite each other, and a third step of entering the electrolyte membrane into the recess to ensure a seal between the electrolyte membrane and the separator at the recess, by changing at least once a water content of the electrolyte membrane in a designated range from a low moisture side to a high moisture side and generating expansion due to moisture absorption of the electrolyte membrane.

With this manufacturing method, the electrolyte membrane uses the property of expanding according to the moisture content, and the electrolyte membrane is entered into the recess of the separator to ensure the seal. Therefore, it is not necessary to form the electrolyte membrane in the shape of the convex part that fits with the recess of the separator. As a result, it is possible to simplify the manufacturing process of the fuel cell.

BRIEF DESCRIPTION OF DRAWINGS

FIG. 1 is an explanatory drawing showing the schematic structure of a fuel cell 20 as a first embodiment of the present invention;

FIG. 2 is an explanatory drawing showing an example of the manufacturing method of a separator 50;

FIG. 7 is an explanatory drawing showing the schematic structure of the fuel cell 420 as a third embodiment;

FIG. 8 is an explanatory drawing showing the schematic structure of the fuel cell 520 as a fourth embodiment;

FIG. 11 is an explanatory drawing showing the schematic structure of the fuel cell 720 as a sixth embodiment;

FIG. 12 is an explanatory drawing showing the schematic structure of the fuel cell 820 as the seventh embodiment;

DESCRIPTION OF EMBODIMENT

Figure 3:
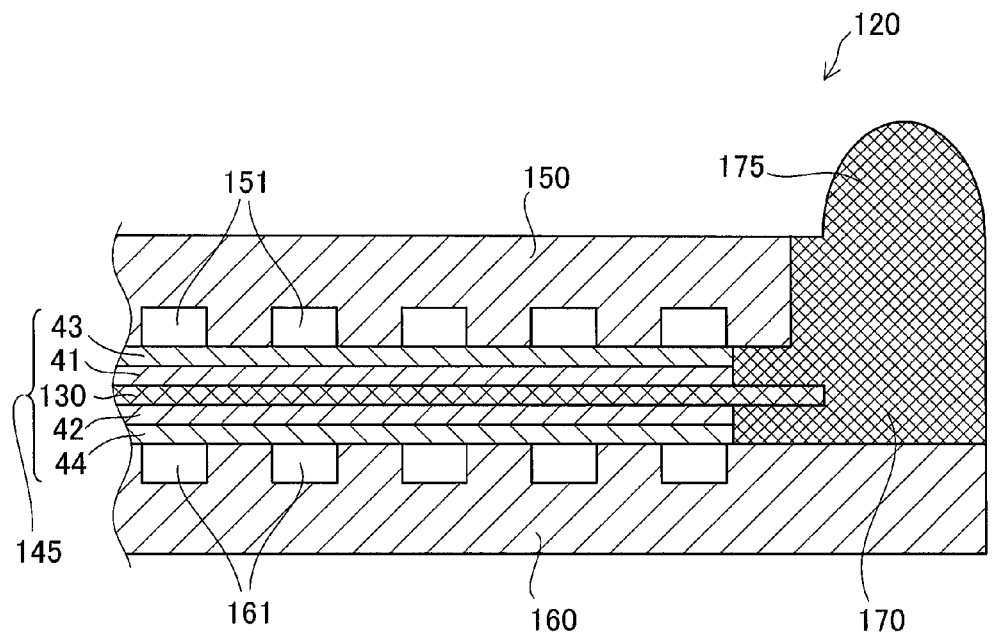
FIG. 3 is an explanatory drawing showing the schematic structure of a gasket seal type fuel cell 120 as a comparison example.

Following embodiments of the present invention will be described.

A. First Embodiment

FIG. 1 is an explanatory drawing showing the schematic structure of a fuel cell 20 as a first embodiment of the present invention. FIG. 1 shows part of a cross section of the lamination direction of the members constituting the fuel cell 20. Following, this lamination direction is also simply called the lamination direction, and the direction orthogonal to the lamination direction is also called the orthogonal direction. Also, the surface orthogonal to the lamination direction of the members constituting the fuel cell 20 is also called the lamination surface. The fuel cell 20 is a solid polymer type fuel cell. The rated operating temperature of the fuel cell 20 of this embodiment is 70 to 90° C. As shown in the drawing, the fuel cell 20 is equipped with an electrolyte membrane 30, an anode electrode 41, a cathode electrode 42, gas diffusion layers 43 and 44, and separators 50 and 60, and is formed by these being laminated.

The electrolyte membrane 30 consists of a solid polymer exhibiting proton conductivity in a wet state, and has the property of expanding due to moisture absorption. With this embodiment, PTFE (Polytetrafluorethylene) object is used as this solid polymer. The electrolyte membrane 30 of this embodiment has the property of expanding about 10 to 15% in a sufficiently wet state compared to a dry state. An anode 41 and a cathode 42 are laminated on both surfaces of the center part of the electrolyte membrane 30. With this embodiment, the anode electrode 41 and the cathode electrode 42 are equipped with carbon particles supported in a platinum catalyst, and an electrolyte of the same properties as the polymer electrolyte constituting the electrolyte membrane 30. The anode electrode 41 and cathode electrode 42, together with the electrolyte membrane 30 described above, constitute a membrane electrode assembly (hereafter also referred to simply as MEA).

The gas diffusion layers 43 and 44 are laminated at positions corresponding to the anode electrode 41 and the cathode electrode 42 of both surfaces of the MEA. The gas diffusion layers 43 and 44 are flow paths of the reaction gas (fuel gas and oxidation gas) supplied for the electrochemical reaction with the fuel cell 20, and also perform power collection. The gas diffusion layers 43 and 44 can be formed using electrically conductive members having gas permeability, for example, carbon paper, carbon cloth, metal mesh, foam metal or the like. With this embodiment, carbon paper was used for the gas diffusion layers 43 and 44. Together with the MEA described above, the gas diffusion layers 43 and 44 constitute a membrane electrode and gas diffusion layer assembly (hereafter also referred to simply as MEGA) 45. With this embodiment, the laminated surface of the MEGA 45 is a rectangular shape.

The anode electrode 41, the cathode electrode 42, and the gas diffusion layers 43 and 44 are not laminated on the outer edge part 31 of the electrolyte membrane 30 constituting the MEGA 45. With this embodiment, the thickness of the lamination direction of the outer edge part 31 is formed so as to be roughly the same thickness of the thickness of the part of the MEGA 45 at which the anode electrode 41, the cathode electrode 42, and the gas diffusion layers 43 and 44 are laminated (hereafter also called the power generating surface). Though omitted in the drawing, this outer edge part 31 is formed extending across the entire outer edge of the lamination surface of the MEGA 45. The thickness of the outer edge part 31 is also acceptable not being roughly the same as the thickness of the MEGA 45 at the power generating surface. For example, the thickness of the outer edge part 31 may also be the same thickness as the electrolyte membrane at the power generating surface. Alternatively, the thickness of the outer edge part 31 can be set to be roughly the same thickness as the thickness of the MEGA 45 at the power generating surface when the outer edge part 31 absorbs moisture and has undergone maximum expansion.

The outer edge part 31 is equipped with convex parts 32 and 33 projecting in the lamination direction from the lamination surface at both sides of its lamination surface. The convex parts 32 and 33 are formed using a polymer material that expands with moisture absorption. With this embodiment, the same electrolyte as the electrolyte membrane 30 is used as the polymer material. In this way, if the material of the electrolyte membrane and the convex parts 32 and 33 are in common, it is possible to reduce the number of parts, and manufacturing of the fuel cell 20 can be performed efficiently. Also, the convex parts 32 and 33 can be formed as an integral unit with the electrolyte membrane 30 using the electrolyte. With this embodiment, the convex part 32 and the convex part 33 are formed at the same position in the orthogonal direction. In the convex parts 32 and 33, at least one part further to the tip side than that attachment base has a shape for which the cross section area of the direction intersecting the lamination direction is large, comparing to the attachment base of the convex shape projection. More specifically, midway between the attachment base of the convex shape projection and the tip has a shape for which the cross section is at its maximum in the direction intersecting the lamination direction. The length in the lamination direction of the convex parts 32 and 33 can be set in a range less than the thickness of the separators 50 and 60, for example to several hundred μm.

The separators 50 and 60 are laminated on both surfaces of the MEGA 45. The separators 50 and 60 function as bulkheads for the reaction gas supplied for electrochemical reactions of the fuel cell 20. The separators 50 and 60 can be formed using electrically conductive members that are gas impermeable, for example, members consisting of compressed carbon or stainless steel. With this embodiment, stainless steel is used for the separators 50 and 60.

With the separators 50 and 60, a plurality of groove parts 51 and 61 recessed in the lamination direction are equipped at a designated pitch at positions corresponding to the power generating surface of the MEGA 45. The groove part 51 functions as a flow path of fuel gas containing hydrogen. The fuel gas is supplied to the groove part 51 from the fuel gas supply manifold (not illustrated) formed on the other cross section surface of the separator 50. The fuel gas is then supplied to the anode electrode 41 via the gas diffusion layer 43 for electrochemical reactions. The fuel gas is then exhausted from the fuel gas exhaust manifold (not illustrated) formed on the other cross section surface of the separator 50. The groove part 61 functions as a flow path of oxidation gas containing oxygen. The oxidation gas is supplied to the groove part 61 from the oxidation gas supply manifold (not illustrated) formed on the other cross section surface of the separator 60. The oxidation is then supplied to the cathode electrode 42 via the gas diffusion layer 44 for electrochemical reactions. The oxidation is then exhausted from the oxidation gas exhaust manifold (not illustrated) formed on the other cross section surface of the separator 60. The form of the separator is not particularly limited, but for example can be of a type for which the lamination surface is formed flat, and which is equipped with a connecting hole which becomes the flow path of the reaction gas on the interior.

Also, the separators 50 and 60 are equipped with recesses 52 and 62 which are recesses in the lamination direction at the outer circumference parts of the surface of the side in contact with the MEGA 45 among the lamination surfaces. In specific terms, the parts at which the recesses 52 and 62 are equipped with correspond to the convex parts 32 and 33 of the electrolyte membrane 30. The recesses 52 and 62 are formed as part of the separators 50 and 60. With this embodiment, in the recesses 52 and 62, at least one part further to the interior side in the lamination direction than the opening part has a shape for which the opening cross section area is large, comparing to the opening part of the recess shape. By fitting the convex parts 32 and 33 of the MEGA 45 with the recesses 52 and 62, the convex part 32 of the separator 50 and the convex part 33 of the separator 60 are respectively in contact at the contact locations CP. By this contact at the contact locations CP, sealing is achieved between the electrolyte membrane 30 and the separators 50 and 60. The MEGA 45 correlates to the power generating body, and the convex parts 32 and 33 and the recesses 52 and 53 correlate to the sealing part.

With this sealing structure, the electrolyte membrane 30 has a property of expanding with moisture absorption, so by the convex parts 32 and 33 absorbing moisture and expanding, a force that tries to expand in the orthogonal direction acts on the convex parts 32 and 33 projecting from the lamination surface of the outer edge part 31, so by contact with the contact locations CP, it is possible to reliably seal between the electrolyte membrane 30 and the separators 50 and 60. Also, by the electrolyte membrane 30 sufficiently absorbing moisture during operation of the fuel cell 20, the convex parts 32 and 33 expand significantly. As a result, the sealing properties at the contact locations CP are further improved. The moisture absorption of the electrolyte membrane 30 can be caused, for example, by moving generated water generated with the cathode electrode 42 to the electrolyte membrane 30, or by moving moisture contained in the fuel gas supplied to the groove part 51 to the electrolyte membrane 30.

Furthermore, with this embodiment, a designated gap is ensured between the tip part of the convex parts 32 and 33 and the recessed bottom surface of the recesses 52 and 62. This gap is of a size for which a gap can be ensured even in a state when the convex parts 32 and 33 are expanded due to moisture absorption.

With the fuel cell 20 of this constitution, the number of fuel cells correlating to the required power are laminated, and furthermore, the fuel cell stack is constituted being sandwiched by the terminal, insulator, and end plates arranged at both ends. The fuel cell stack is clamped with a designated clamp load in the lamination direction. With this clamp force, the electrode surface pressure required to reduce the contact resistance of the structural members of the fuel cell 30 is ensured.

Following, a specific example of the method of manufacturing the fuel cell 20 of this constitution will be described. The MEGA 45 constituting the fuel cell 20 can be formed, for example, by laminating the electrolyte membrane 30 which does not have convex parts 32 and 33, the anode electrode 41, the cathode electrode 42, and the gas diffusion layers 43 and 44, and then doing thermo compression bonding of electrolyte blocks formed in a designated shape at designated positions of the outer edge part 31 of the electrolyte membrane 30. However, it is also possible to manufacture the electrolyte membrane 30 having the convex parts 32 and 33 using a forming die or the like at the stage of manufacturing the electrolyte membrane 30.

The separators 50 and 60 constituting the fuel cell 20 can be manufactured using press working. For example, as shown in FIG. 2A, first, a plate member made of the material of the separator 50 is prepared, as shown in FIG. 2B, a U-shaped recess is formed by press working, and as shown in FIG. 2C, by pressing in the internal direction from both ends of the plate member, it is possible to form the recesses 52 and 62. However, it is also possible to use machining, or to use a combination of press working and machining. It is also possible to form the groove parts 51 and 61 of the separators 50 and 60 using press working or machining or the like.

The MEGA 45 and separators 50 and 60 produced in this way are laminated by having the convex parts 32 and 33 of the MEGA 45 fit together with the recesses 52 and 62 of the separators 50 and 60. By doing this, the fuel cell 20 is completed.

With the fuel cell 20 of this constitution, from among the convex parts 32 and 33 of the electrolyte membrane 30 and the recesses 52 and 62 of the separator 50 and 60 that seal reaction gas using a fitting structure, the convex parts 32 and 33 are formed using a polymer material that expands with moisture absorption. Accordingly, when the convex parts 32 and 33 expand due to the generated water that is generated along with operation of the fuel cell 20 or the moisture contained in the fuel gas supplied to the MEGA 45 via the groove part 51, the adhesion of the convex parts 32 and 33 and the recesses 52 and 62 increases. That enables to improve the sealing properties. Therefore, it is possible to reduce the clamp load in the fuel cell 20 lamination direction that is required to ensure the sealing properties. As a result, it is possible to reduce the rigidity of the fuel cell members, to lower the cost of the fuel cell 20, and to contribute to resource saving.

Also, with the fuel cell 20, it is possible to perform sealing by having the convex parts 32 and 33 and the recesses 52 and 62 be in contact in the direction intersecting the lamination direction at the contact locations CP, so a large clamp load is not required to ensure the sealing properties. Specifically, it is possible to reduce the clamp load.

Also, with the fuel cell 20, the convex parts 32 and 33 and the recesses 52 and 62 are fit together in a positional relationship having a gap between the tip part of the convex parts 32 and 33 and the recessed bottom surface of the recesses 52 and 62 even in a state with the convex parts 32 and 33 expanded due to moisture absorption. This means that there is no reaction force generated in the lamination direction, specifically, the direction for which the fitting relationship of the convex parts 32 and 33 and the recesses 52 and 62 is eliminated, due to contact of the tip part of the convex parts 32 and 33 and the bottom surface of the recesses 52 and 62 when the convex parts 32 and 33 are expanded due to moisture absorption. As a result, the clamp load for suppressing deformation in the lamination direction of the fuel cell 20 due to expansion of the convex parts 32 and 33 becomes unnecessary, making it possible to reduce the clamp load.

Also, in the fuel cell 20, with the convex parts 32 and 33, at least a part further to the tip side than the convex shape attachment base has a shape for which the cross section area of the direction intersecting the lamination direction is large. With the recesses 52 and 62, at least a part further to the inside than the recess shaped opening part has a shape for which the opening cross section area is large. Therefore, once the convex parts 32 and 33 and the recesses 52 and 62 are fit together, it is difficult to eliminate that fitted relationship. For example, even if the gas pressure of the reaction gas is high to some extent, the convex parts 32 and 33 are pressed by the gas pressure, and the fitted relationship of the convex parts 32 and 33 and the recesses 52 and 62 does not come apart. Therefore, it is not necessary to apply excessive clamp load to maintain the fitted relationship. In other words, it is possible to reduce the clamp load of the fuel cell 20.

Also, the convex parts 32 and 33 are formed as an integrated unit with the electrolyte membrane 30 using the electrolyte, so the generated water that is generated along with operation of the fuel cell 20 easily reaches the convex parts 32 and 33. Specifically, it is possible to reliably expand the convex parts 32 and 33, and possible to sufficiently ensure the sealing properties between the convex parts 32 and 33 and the recesses 52 and 62.

Also, with the fuel cell 20, the convex parts 32 and 33 and the recesses 52 and 62 are fit together, and the MEGA 45 and the separators 50 and 60 are laminated, so the MEGA 45 and the separators 50 and 60 can be attached and detached easily. Therefore, when only a portion of the members of the fuel cell 20 is damaged or degraded, it is possible to easily replace only the damaged part. For example, when the MEGA 45 is damaged, it is possible to replace only the MEGA 45, and to laminate again using the existing separators 50 and 60. As a result, it is possible lower repair costs and to contribute to resource saving. Moreover, with the fuel cell 20, a gasket or the like is not required as a sealing member. Furthermore, at the manufacturing stage of the fuel cell 20, when laminating the MEGA 45 and the separators 50 and 60, it is possible to suppress positional skew during lamination because the positional relationship of both items is definitively determined by the convex parts 32 and 33 and the recesses 52 and 62. Furthermore, the convex parts 32 and 33 are formed on the MEGA 45 which has thin thickness, so during manufacturing of the fuel cell 20, ease of handling the MEGA 45 is improved.

The clamp load reduction effect described above will be further described. FIG. 3 shows the constitution of the gasket seal type fuel cell 120 as a comparison example. In FIG. 3, the same constitutional items as those of the fuel cell 20 are given the same code numbers as FIG. 1, and a description will be omitted. As shown in the drawing, the fuel cell 120 is constituted by laminating the separators 150 and 160 on both surfaces of the MEGA 145. Also, the fuel cell 120 is equipped with a gasket 170 on the outer edge part of the MEGA 145. The end part of the electrolyte membrane 130 is embedded in the interior of the gasket 170. This gasket 170 has a convex part 175 for which the separator 150 side projects in relation to the lamination surface. With this fuel cell 120, when laminated with another fuel cell (not illustrated), sealing is ensured by the convex part 175 being in sufficient contact with the other fuel cell separator using clamp force.

Figure 4:
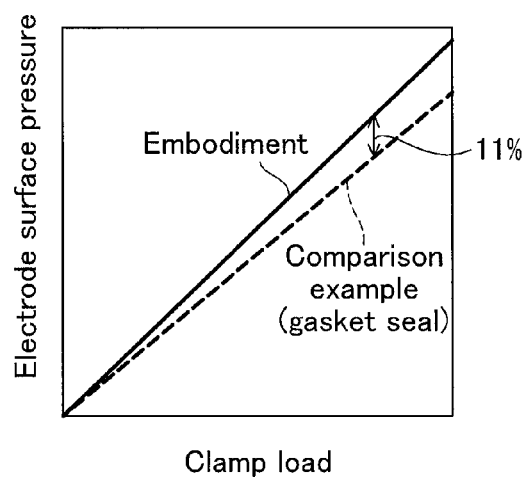
FIG. 4 is an explanatory drawing showing a specific example of the clamp load reduction effect with the fuel cell 20.

FIG. 4 shows an example of the relationship between the clamp load and the electrode surface pressure with the fuel cell 20 as an embodiment and the fuel cell 120 as a comparison example. As shown in the drawing, if the clamp load value is the same, the electrode surface pressure with the fuel cell 20 is approximately 11% larger. This is because with the constitution of the fuel cell 120, the clamp load is received by the convex part 175 of the gasket 170, so the electrode surface pressure is decreased by that amount, but with the constitution of the fuel cell 20, there is no projecting shape such as with the gasket 170, so there is no decrease in the electrode surface pressure. The results in FIG. 4, to say this in the opposite way, are that the clamp load required to ensure the same electrode surface pressure is about 10% smaller with the fuel cell 20. This means that with the various constitutions described above, the clamp load required to ensure the sealing properties is reduced.

Figure 5:
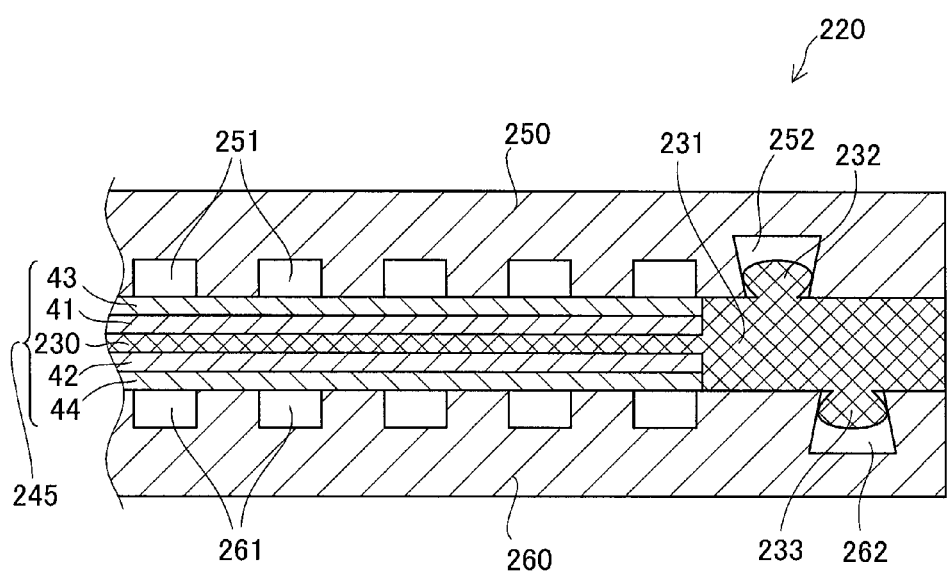
FIG. 5 is an explanatory drawing showing the schematic structure of a fuel cell 220 as a modification example.

A modification example of the fuel cell 20 is shown as the fuel cell 220 in FIG. 5. In FIG. 5, same constitutional items as shown in FIG. 1 are given the same code numbers as FIG. 1. Following, for the fuel cell 220, a description will be omitted for the same constitutional items as those of the fuel cell 20, and only differences from the fuel cell 20 will be described. The electrolyte membrane 230 of the MEGA 245 that the fuel cell 220 is equipped with is equipped with an outer edge part 231, the same as with the fuel cell 20. The convex parts 232 and 233 formed at both surfaces of this outer edge part 231 are formed at different positions in the orthogonal direction. Also, due to this point, the recess 252 and the recess 262 of the separators 250 and 260 respectively fitted together with the convex parts 232 and 233 are formed at positions corresponding to the convex parts 232 and 233.

With the fuel cell 220 of this constitution, it is possible to easily distinguish the front and back of the MEGA 245 by the formation positions of the convex parts 232 and 233. Also, with the outer edge part 231, the surface on the side opposite the positions at which the convex parts 232 and 233 are formed is flat, so at the manufacturing stage of the fuel cell 220, it is easy to fit the convex parts 232 and 233 into the recesses 252 and 262 from the flat surface side, making manufacturing of the fuel cell 220 easier.

B. Second Embodiment

Figure 6:
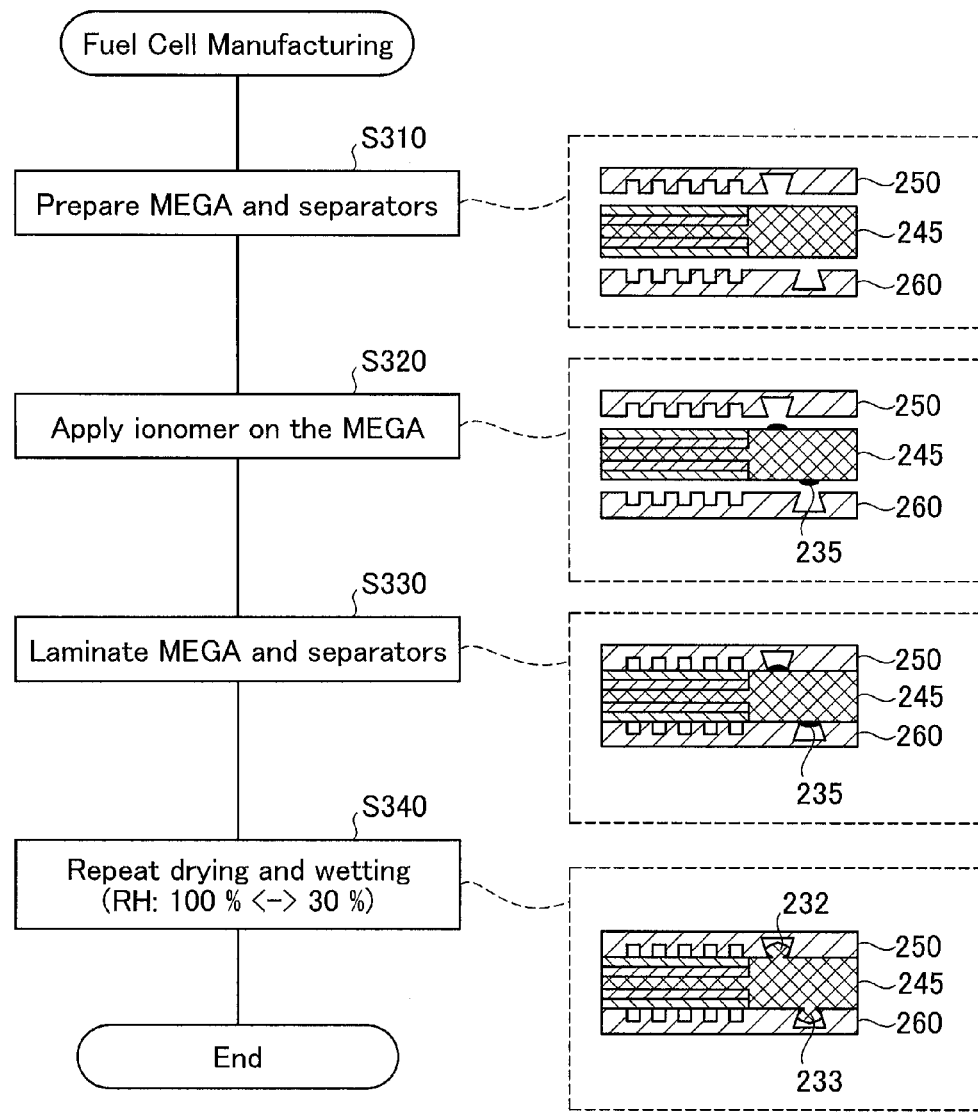
FIG. 6 is a process drawing showing the manufacturing method of the fuel cell 220 as a second embodiment.

A second embodiment of the present invention will be described. The second embodiment differs from the first embodiment only in the manufacturing method of the fuel cell. Here, the manufacturing method of the fuel cell of a second embodiment as the manufacturing method of the fuel cell 220 described above will be described. FIG. 6 is a process drawing showing the manufacturing method of the fuel cell 220. As shown in the drawing, with the manufacturing method of the fuel cell 220, first, the MEGA 245 and the separators 250 and 260 are prepared (step S310). At this point in time, the convex parts 232 and 233 are not formed on the electrolyte membrane 230 constituting the MEGA 245 prepared here.

When the MEGA 245 and the separators 250 and 260 are prepared, next, an ionomer 235 (liquid form electrolyte) is applied at the positions at which the convex parts 232 and 233 of the MEGA 245 are to be formed, said a different way, the positions corresponding to the recesses 252 and 262 of the separators 250 and 260 (step S320). This step is not essential. When the ionomer 235 is coated, next, the MEGA 245 and the separators 250 and 260 are laminated (step S330).

When the MEGA 245 and the separators 250 and 260 are laminated, next, drying and wetting is repeated (step S340). With this embodiment, for this process, the laminated MEGA 245 and the separators 250 and 260 are set in a designated hermetically sealed environment. Then, this is performed by repeating a step of changing the relative humidity RH of that hermetically sealed environment from 100% to 30%, and a step of changing it from 30% to 100%. The range in which the relative humidity RH is changed can be set as appropriate. When the relative humidity RH become high, the electrolyte membrane 230 of the MEGA 245 absorbs moisture and expands. On the other hand, when the relative humidity RH becomes low, the electrolyte membrane 230 discharges moisture and shrinks. In other words, by repeating drying and wetting, expansion and shrinking of the electrolyte membrane 230 is repeated. With this operation, the electrolyte membrane 230 gradually enters the recesses 252 and 262 of the separators 250 and 260, and finally, the convex parts 232 and 233 are formed on the electrolyte membrane 230. Depending on the expansion characteristics of the electrolyte, the process of step S340 is acceptable as long as it is a process for which the moisture content of the electrolyte membrane 230 is changed from the low moisture side to the high moisture side at least one time. Specifically, if the electrolyte membrane 230 sufficiently enters the recesses 252 and 262 of the separators 250 and 260 by one expansion of the electrolyte membrane 230, it is acceptable to change the moisture content of the electrolyte membrane 230 from the low moisture side to the high moisture side just one time.

With this manufacturing method of the fuel cell 220, the convex parts 232 and 233 are formed using the characteristic of the electrolyte membrane 230 expanding due to moisture absorption. Accordingly, it is not necessary to form the convex parts 232 and 233 at the manufacturing stage of the MEGA 245. In other words, it is possible to omit the forming step for the convex parts 232 and 233, so it is possible to simplify the manufacturing process of the fuel cell 220. Moreover, with the process of laminating the MEGA 245 and the separators 250 and 260, it is possible to omit the process of fitting the convex parts 232 and 233 of the MEGA 245 into the recesses 252 and 262 of the separators 250 and 260. That enables to simplify the manufacturing process of the fuel cell 220.

Also, the ionomer 235 is coated at the positions corresponding to the formation of the convex parts 232 and 233 of the MEGA 245, making it easier to fill in the gap between the recesses 252 and 262 of the separators 250 and 260 and the convex parts 232 and 233 of the MEGA 245. As a result, it is possible to improve the sealing properties between the recesses 252 and 262 and the convex parts 232 and 233. Alternatively, it is possible to reduce the number of repetitions of drying and wetting of step S340 noted above.

C. Third Embodiment

A third embodiment of the present invention will be described. FIG. 7 shows the schematic structure of a fuel cell 420 as a third embodiment. In FIG. 7, the same constitutional items as those of the first embodiment (FIG. 1) are given the same code numbers as in FIG. 2. Following, for the fuel cell 420, a description of the same constitutional items as those of the first embodiment will be omitted, and only the differences from the first embodiment will be described. The difference from the first embodiment is that the electrolyte membrane 430 of the MEGA 445 constituting the fuel cell 420 as the third embodiment is equipped with an internal member 471 on the inside of the outer edge part 431. This internal member 471 is a plate shaped member with a smaller elasticity than the electrolyte that forms the electrolyte membrane 430. With the cross section shown in FIG. 7, the internal member 471 is formed in a shape that roughly follows the convex shape of the convex parts 432 and 433 formed on the outer edge part 431.

With this embodiment, the internal member 471 is formed in a straight line extending across roughly the entire outer edge part 431 in the orthogonal direction, and furthermore, at the positions corresponding to the convex parts 432 and 433, the convex shaped parts 472 and 473 that follow the convex shape of the convex parts 432 and 433 are formed. The convex shaped parts 472 and 473 reach the interior of the convex parts 432 and 433. The internal member 471 can also be arranged with convex shapes only at the positions corresponding to the convex parts 432 and 433. Alternatively, the internal member 471 can also be arranged at the power generating surface of the electrolyte membrane 430. In this case, at least the internal member 471 at the power generating surface needs to have a mesh shape so as not to obstruct ion conductivity of the electrolyte membrane 30. It is also possible to have two or more internal members. For example, one each may be provided on the separator 250 side and the separator 260 side.

On the interior of the convex parts 432 and 433, by equipping the internal member 471, which has a smaller elasticity than the electrolyte which is the material of the electrolyte membrane 430, in a shape roughly following the shape of the convex parts 432 and 433 in this way, even with the passage of time or a rise in temperature, the convex parts 432 and 433 do not creep easily. Accordingly, it is possible to improve the durability of the seal structure. Also, if suitable elasticity is given to the internal member 471, a force operates on the convex shaped parts 472 and 473 of the internal member 471 that tries to expand in the orthogonal direction. As a result, the convex parts 432 and 433 are pressed to the side surface of the recesses 252 and 262 of the separators 250 and 260 by the operational force of the convex shaped parts 472 and 473. Therefore, it is possible to improve the sealing properties between the convex parts 432 and 433 and the recesses 252 and 262.

With this embodiment, the internal member 471 is constituted using a shape memory metal. With this embodiment, for the shape memory metal, a titanium-nickel alloy was used, but this is not particularly limited, and for example it is also possible to use an iron-manganese-silicon alloy or the like. As specific shape memory metal compositions, known examples include Ag—Cd (44 to 49 at % Cd), Au—Cd (46.5 to 50 at % Cd), Cu—Al—Ni (14 to 14.5 wt % Al, 3 to 4.5 wt % Ni), Cu—Sn (approximately 15 at % Sn), Cu—Zn (38.5 to 41.5 wt % Zn), Cu—Zn—X (X=Si, Al, Sn), Fe—Pt (approximately 25 at % Pt), Mn—Cu (5 to 35 at % Cu), Fe—Mn—Si, Pt type alloy, Co—Ni—Al, Co—Ni—Ga, Ni—Fe—Ga. However, it is also possible to use shape memory resin as the material for the internal member 471. Basically, the material of the internal member 471 does not have to have shape memory characteristics, and is acceptable as long as it has elasticity lower than that of the electrolyte which is the material of the electrolyte membrane 30. For example, it is also possible to used resins such as PEN, PP or the like, or various metal materials.

The internal member 471 with this embodiment has a shape memory characteristic as follows: in the rated operating temperature range of the fuel cell 420, the shape is such that the width in the orthogonal direction of the convex shape parts 472 and 473 is relatively large; and at normal temperature, specifically, in the ambient temperature range during manufacturing of the fuel cell 420, the shape is such that the width in the orthogonal direction of the convex shape parts 472 and 473 is relatively small. By having this shape storage characteristic, at the manufacturing stage of the fuel cell 420, when laminating the MEGA 445 and the separators 250 and 260, the width in the orthogonal direction of the convex shape parts 472 and 473 is relatively small. Accordingly, it is easier to fit the convex parts 432 and 433 of the MEGA 445 into the recesses 252 and 262 of the separators 250 and 260. As a result, manufacturing of the fuel cell 420 is easier. Moreover, during rated operation of the fuel cell 420, the width in the orthogonal direction of the convex shaped parts 472 and 473 becomes relatively large, so the adhesion between the convex parts 432 and 433 and the recesses 252 and 262 increases, making it possible to improve the sealing properties. It is preferable to set the transformation point of the internal member 471 to a temperature higher than the ambient temperature range during manufacturing of the fuel cell 20, and to an extremely low temperature. This is because it is desirable to improve the sealing properties even when launching operation of the fuel cell 420.

However, the shape memory characteristic of the internal member 471 is not limited to the example described above. For example, with the internal member 471, it is also possible to have shape memory characteristics as follows: in the rated operating temperature range of the fuel cell 420, the shape is such that the width in the orthogonal direction of the convex shaped parts 472 and 473 is relatively small; and near normal temperature, specifically, in the operating temperature range when launching operation of the fuel cell 420, the shape is such that the width in the orthogonal direction of the convex shaped parts 472 and 473 is relatively large. By having this shape memory characteristic, when launching the operation of the fuel cell 420, the width in the orthogonal direction of the convex shaped parts 472 and 473 is relatively large, so the adhesion of the convex parts 432 and 433 between the recesses 252 and 262 is increased, making it possible to sufficiently improve the sealing properties. Meanwhile, during rated operation of the fuel cell 420, the width in the orthogonal direction of the convex shaped parts 472 and 473 becomes relatively small, and the sealing property improvement effect by the internal member 471 is smaller, but during rated operation, the electrolyte membrane 430 expands sufficiently due to moisture absorption, so it is possible to ensure sufficient sealing properties. In that case, the transformation point of the internal member 471 can be set considering the relationship of the electrolyte membrane 430 temperature and moisture absorption characteristics during launching of operation of the fuel cell 420.

Following, a specific example of the manufacturing method of the fuel cell 420 of this constitution will be described. The MEGA 445 constituting the fuel cell 420 can be produced as follows, for example. First, two electrolyte membranes and the internal member 471 are prepared, the electrolyte membrane, the internal member 471, and the electrolyte membrane are laminated in sequence and thermal press processing is performed, and the outer edge part 431 is produced. Then, the electrolyte membrane for which the anode electrode 41, the cathode electrode 42, and the gas diffusion layers 43 and 44 are laminated is joined with the outer edge part 431 using thermal press processing or the like, and the MEGA 445 is produced. When the MEGA 445 produced in this way is laminated with the separators 250 and 260 in the same way as with the first embodiment, the fuel cell 420 is completed.

D. Fourth Embodiment

A fourth embodiment of the present invention will be described. FIG. 8 shows the schematic structure of a fuel cell 520 as a fourth embodiment. In FIG. 8, the same constitutional items as those of the first embodiment (FIG. 1) are given the same code numbers as FIG. 1. Following, for the fuel cell 520, a description of the same constitutional items as in the first embodiment will be omitted, and only the differences from the first embodiment will be described. The separators 550 and 560 constituting the fuel cell 520 as the fourth embodiment are equipped with recesses 552 and 562 at positions corresponding to the convex parts 232 and 233 of the MEGA 245. Shape memory members 553 and 563 are respectively joined on the surface forming the recession of the recesses 552 and 562 and on the front surface of the separators 550 and 560 in the periphery of the recesses 552 and 562.

With this embodiment, the shape memory members 553 and 563 consist of a shape memory alloy. Here, a titanium-nickel alloy was used as the shape memory alloy, but the same as with the internal member 471 of the third embodiment, this is not particularly limited. The shape memory members 553 and 563 of this embodiment have a shape memory characteristics as follows: in the rated operating temperature range of the fuel cell 520, the shape is such that the width in the orthogonal direction of the opening part of the shape memory members 553 and 563 is relatively small; and at normal temperature, specifically, in the ambient temperature range during manufacturing of the fuel cell 520, the shape is such that the width in the orthogonal direction of that opening part is relatively large. By having these shape memory characteristics, at the manufacturing stage of the fuel cell 520, when the MEGA 245 and the separators 550 and 560 are laminated, the width in the orthogonal direction of the opening part of the shape storage member 553 and 563 is relatively large. Accordingly, the recesses 552 and 562 follow the shape of the shape memory members 553 and 563, and it is easier to fit the convex parts 232 and 233 of the MEGA 245 into the recesses 552 and 562 equipped with the shape memory members 553 and 563. As a result, it is easier to manufacture the fuel cell 520. Moreover, during rated operation of the fuel cell 520, the width in the orthogonal direction of the opening part of the shape memory members 553 and 563 is relatively small, so the recesses 552 and 562 follow the shape of the shape memory members 553 and 563, and also, the adhesion between the convex parts 232 and 233 and the shape memory members 553 and 563 increases, so it is possible to improve the sealing properties. It is acceptable as long as the shape memory members 553 and 563 are joined to at least the surface forming the convex parts 552 and 562. Also, it is preferable that the transformation point of the shape memory members 553 and 563 be set to a temperature higher than the ambient temperature range during manufacturing of the fuel cell 520, and to an extremely low temperature.

However, the shape memory characteristics of the shape memory members 553 and 563 are not limited to the example described above. For example, the shape memory members 553 and 563 may also have shape memory characteristics as follows: in the rated operating temperature range of the fuel cell 520, the shape is such that the width in the orthogonal direction of the opening part of the shape memory members 553 and 563 is relatively large; and near normal temperature, specifically, in the operating temperature range when launching operation of the fuel cell 520, the shape is such that the width in the orthogonal direction of that opening part is relatively small. By having this shape memory characteristic, when launching the operation of the fuel cell 520, the width in the orthogonal direction of the recesses 552 and 562 is relatively small. Accordingly, the adhesion between the convex parts 232 and 233 and the shape memory members 553 and 563 increases, making it possible to improve the sealing properties. Meanwhile, during rated operation of the fuel cell 520, the width in the orthogonal direction of the recesses 552 and 562 is relatively large, and the sealing improvement effect due to the shape memory members 553 and 563 becomes smaller. However, during rated operation, the electrolyte membrane 230 expands due to moisture absorption, so it is possible to ensure sufficient sealing properties. In this case, the transformation point of the shape memory members 553 and 563 may be set taking into consideration the relationship between the temperature of the electrolyte membrane 230 during launching of the operation of the fuel cell 520 and the moisture absorption characteristics.

E. Fifth Embodiment

Figure 9:
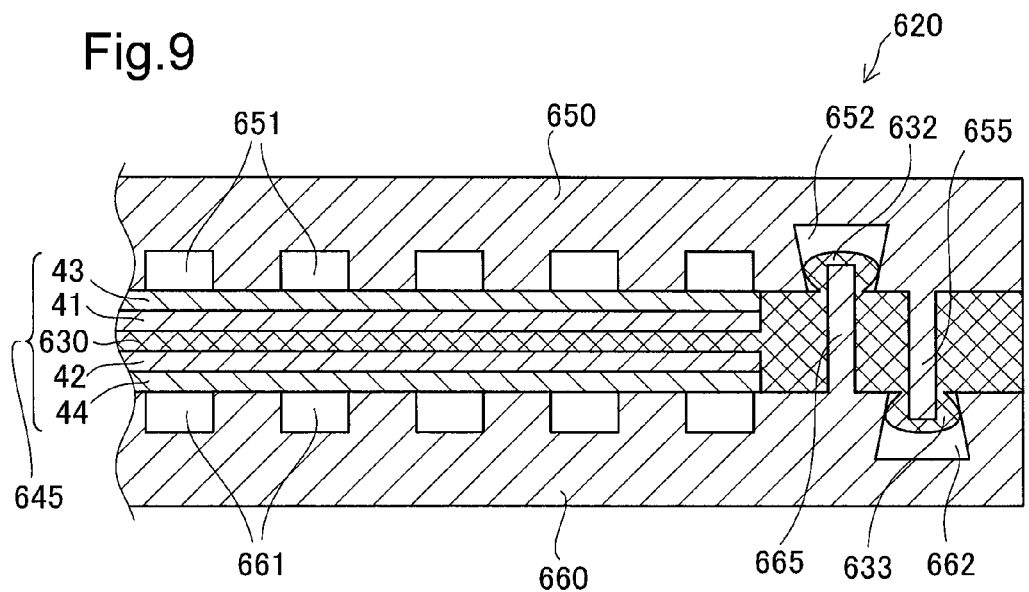
FIG. 9 is an explanatory drawing showing the schematic structure of the fuel cell 620 as a fifth embodiment.

A fifth embodiment of the present invention will be described. FIG. 9 shows the schematic structure of a fuel cell 620 as the fifth embodiment. In FIG. 9, for the same constitutional items as those of the first embodiment (FIG. 1), the same code numbers are given as in FIG. 1. Following, for the fuel cell 620, a description will be omitted for the same constitutional items as those of the first embodiment, and only differences from the first embodiment will be described. The separators 650 and 660 constituting the fuel cell 620 as the fifth embodiment are respectively equipped with recesses 652 and 662 at positions corresponding to the convex parts 632 and 633 of the electrolyte membrane 630 constituting the MEGA 645.

Also, the separator 650 is equipped with a projecting part 655 projecting to the separator 660 side from the lamination surface of the separator 650 at a position corresponding to the recess 662 of the separator 660. This projecting part 655 abuts the convex part 633 of the electrolyte membrane 630. Similarly, the separator 660 is equipped with a projecting part 665 projecting to the separator 650 side from the lamination surface of the separator 660. This projecting part 665 abuts the convex part 632 of the electrolyte membrane 630.

Figure 10:
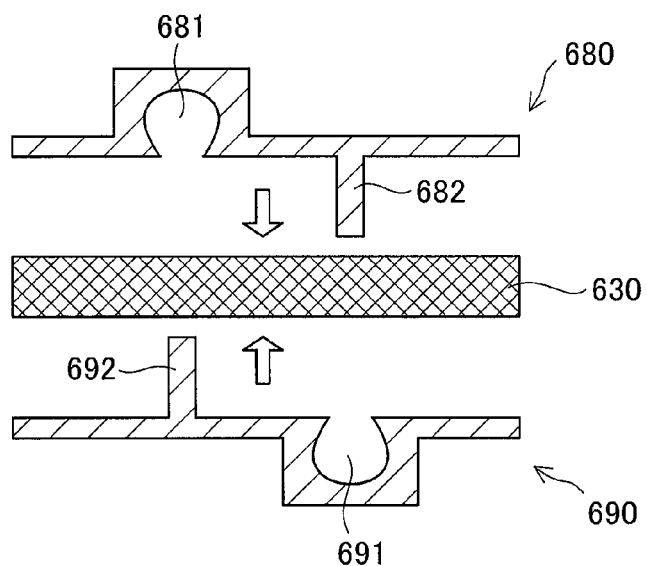
FIG. 10 is an explanatory drawing showing the method of forming the electrolyte membrane 630 that constitutes the fuel cell 620.

As shown in FIG. 10, for the shape of the convex parts 632 and 633 of the electrolyte membrane 630 constituting this fuel cell 620, the membrane shaped electrolyte membrane 630 can be formed by thermal press processing from both surfaces using forming dies 680 and 690. This forming die 680 is equipped with a recess 681 for forming the convex part 632 and a convex part 682 for forming the convex part 633. Similarly, the forming die 690 is equipped with a convex part 692 for forming the convex part 632 and a convex part 682 for forming the convex part 633. The shape of the recesses 681 and 691 is formed to match the shape of the convex parts 632 and 633. The convex parts 682 and 692 are formed at a length in the lamination direction for which the electrolyte membrane 630 can be pushed into contact with the interior of the recesses 681 and 691. The electrolyte membranes of the first through fourth embodiments described above can also be formed using the same method. However, for the convex parts 632 and 633, it is possible to do thermo compression bonding of an electrolyte block, the same as with the first embodiment. In this case, the projecting parts 655 and 665 may abut the electrolyte membrane 630.

With the fuel cell 620 of this constitution, between the electrolyte membrane 630 and the separator 650, and between the electrolyte membrane 630 and the separator 660, sealing is done at two locations. For example, sealing between the electrolyte membrane 630 and the separator 650 is performed at two locations, between the convex part 632 and the recess 652, and between the convex part 633 and the projecting part 655. Therefore, it is possible to improve the sealing properties. Moreover, even if the seal is eliminated at one of the locations among the two sealing locations, it is possible to ensure the seal at the other sealing location, so sealing reliability is improved. The cross section shape of the lamination direction of the projecting parts 655 and 665 is not limited to being a rectangular shape. For example, it can also be a shape for which the tip part of the projecting parts 655 and 665 broadens in the orthogonal direction. As a result, it is possible to improve the orthogonal direction sealing properties, so a large clamp load is not needed to ensure sealing properties of the projecting parts 655 and 665. It is also possible to have a constitution for which only one of the separators 650 and 660 is equipped with a projecting part.

F. Sixth Embodiment

A sixth embodiment of the present invention will be described. FIG. 11 shows the schematic structure of a fuel cell 720 as the sixth embodiment. In FIG. 11, for the same constitutional items as those of the first embodiment (FIG. 1), the same code numbers will be given as in FIG. 1. Following, for the fuel cell 720, a description will be omitted for the same constitutional items as those of the first embodiment, and only the differences from the first embodiment will be described. The difference from the first embodiment is the fact that the MEGA 745 constituting the fuel cell 720 as the sixth embodiment is equipped with support members 737 and 738 for which the elasticity is smaller than that of the convex parts 732 and 733 that the electrolyte membrane 730 of the MEGA 745 is equipped with. With this embodiment, this support member 737 is arranged on the front surface of electrolyte membrane 730 that is opposite the surface on which the convex part 733 is formed. The support member 737 is arranged at the position at which the convex part 733 of the electrolyte membrane 730 is formed in the orthogonal direction. Also, this support member 737 is arranged on the front surface of electrolyte membrane 730 that is opposite the surface on which the convex part 732 is formed. The support member 737 is arranged at the position at which the convex part 732 of the electrolyte membrane 730 is formed in the orthogonal direction. The support member 738 is arranged adjacent to the cathode electrode 42 and the gas diffusion layer 44. With this embodiment, PP resin is used for the support members 737 and 738. However, it is also possible to use resin such as PEN or the like, or to use various types of metal materials.

With the fuel cell 720 of this constitution, it is possible to improve the strength of the convex parts 732 and 733 using the support members 737 and 738. Moreover, the support member 738 is arranged adjacent to the cathode electrode 42 and the gas diffusion layer 44. Accordingly, it is possible to suppress damage to the electrolyte membrane 730 by eating into the electrolyte membrane 730 by the edge of the gas diffusion layer 44 or the like. The support members 737 and 738 may also be arranged inside the electrolyte membrane 730 at positions at which the convex parts 733 and 734 of the electrolyte membrane 730 are formed in the orthogonal direction. In this way, it is possible to improve the strength of the convex parts 732 and 733. As a result, the convex parts 732 and 733 do not cleave easily, so it is possible to improve the durability of the sealing structure.

G. Seventh Embodiment

A seventh embodiment of the present invention will be described. FIG. 12 shows the schematic structure of a fuel cell 820 as the seventh embodiment. In FIG. 12, the same constitutional items as those of the first embodiment (FIG. 1) are given the same code numbers as in FIG. 1. Following, for the fuel cell 820, descriptions of the same constitutional items as those of the first embodiment will be omitted, and only the differences from the first embodiment will be described. With the fuel cell 820 of the seventh embodiment, the constitution of the MEGA 845 differs from the first embodiment. In specific terms, with the MEGA 845, the material of the convex parts 832 and 833 formed on the outer edge part 831 of the electrolyte membrane 830 is different from the material of the electrolyte membrane 830. With this embodiment, water swellable polyurethane was used as the convex parts 832 and 833. However, it is also possible to form the convex parts 832 and 833 with polymer materials that expand due to moisture absorption. With this embodiment, the convex parts 832 and 833 are thermo compression bonded to the outer edge part 831.

Figure 13:
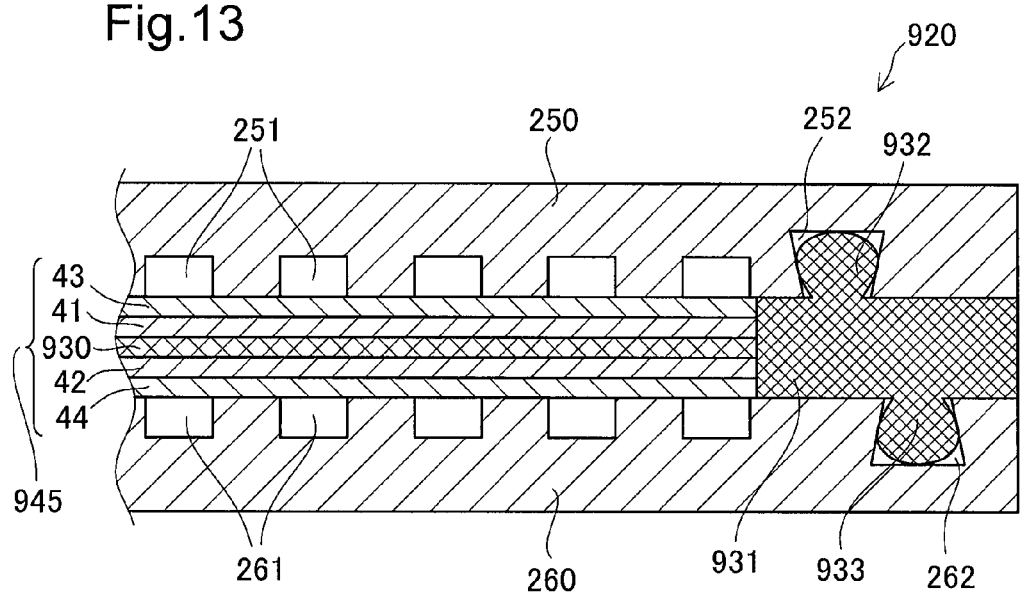
FIG. 13 is an explanatory drawing showing the schematic structure of the fuel cell 920 as a modification example.

Also, FIG. 13 shows the schematic structure of a fuel cell 920 as a modification example of this embodiment. With this example, the electrolyte membrane 930 constituting the MEGA 945 is formed only on the power generating surface. A polymer member 931 formed with a polymer material that expands with moisture absorption is arranged on the outer edge part of this MEGA 945. With this embodiment, the polymer member 931 is thermo compression bonded to the MEGA 945. The convex parts 932 and 933 are formed as an integral unit with the polymer member 931 using the same material as 931. This MEGA 945 and the polymer member 931 correlate to the power generating body.

As is clear from the description above, the convex part constituting the sealing structure of the fuel cell does not have to be formed as part of the electrolyte membrane, but can also be constituted as a separate item from the electrolyte membrane.

H. Eighth Embodiment

Figure 14:
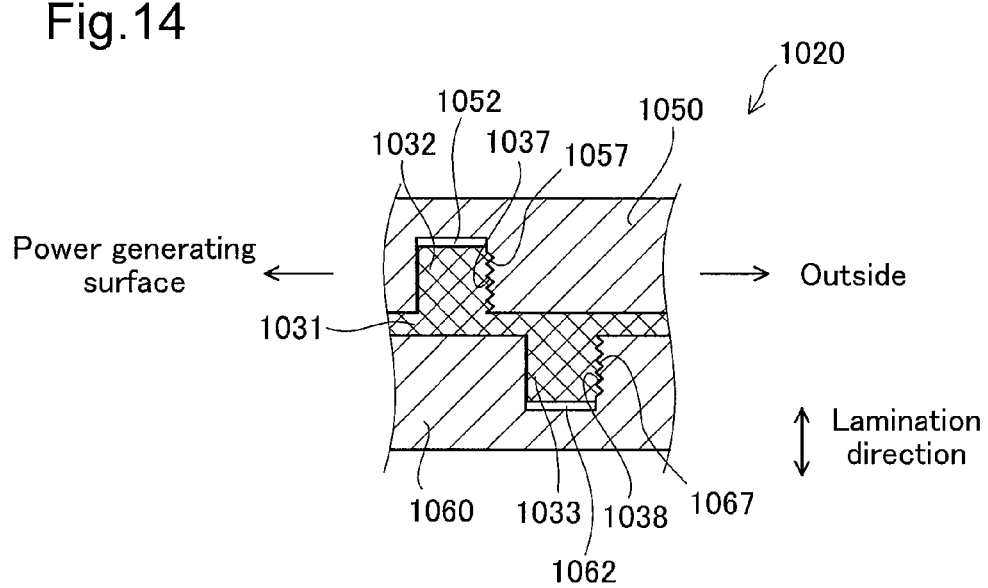
FIG. 14 is an explanatory drawing showing the schematic structure of the fuel cell 1020 as an eighth embodiment.

An eighth embodiment of the present invention will be described. FIG. 14 shows the schematic structure of a fuel cell 1020 as the eighth embodiment. Following, for the fuel cell 1020, descriptions of the same constitutional items as those of the first embodiment will be omitted, and only the differences from the first embodiment will be described. FIG. 14 shows part of the cross section of the lamination direction near the outer edge part of the fuel cell 1020. In FIG. 14, an illustration is omitted of the center part of the fuel cell 1020, specifically, the power generating surface on which are laminated the anode electrode, cathode electrode and the like. As shown in the drawing, convex parts 1032 and 1033 are formed on the outer edge part 1031 of the electrolyte membrane of the fuel cell 1020. Also, recesses 1052 and 1062 are formed on the separators 1050 and 1060.

Screw grooves 1037 and 1038 are respectively formed on the side surface of the outside (side facing opposite the power generating surface described above) of the surfaces on which the convex parts 1032 and 1033 are formed. Also, screw grooves 1057 and 1067 are respectively formed on the side surface of the outside of the surfaces on which the recesses 1052 and 1062 are formed. The screw grooves 1037 and 1038 and the screw grooves 1057 and 1067 are formed in shapes that fit mutually together. FIG. 14 shows a state in which the screw grooves 1037 and 1038 and screw grooves 1057 and 1058 are fit together, and the separators 1050 and 1060 and the MEGA are laminated. It is also possible to use a constitution for which the screw grooves 1037 and 1038 are formed on the side surface of the inside of the surfaces on which the convex parts 1032 and 1033 are formed, and the screw grooves 1057 and 1067 are formed on the side surface of the inside among the surfaces on which the recesses 1052 and 1062 are formed.

Figure 15:
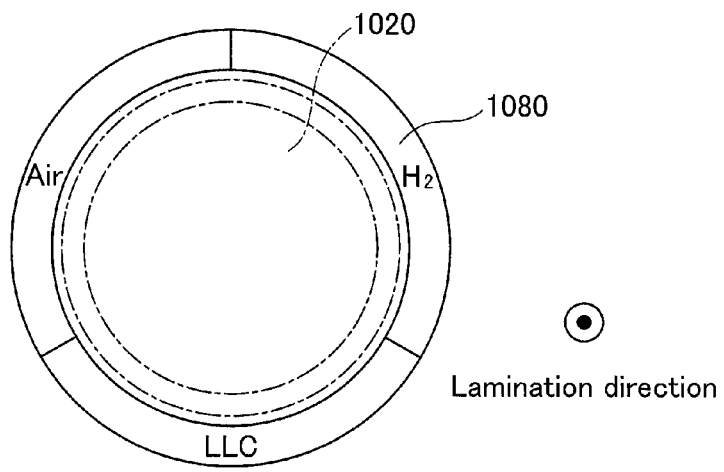
FIG. 15 is an explanatory drawing seen from the lamination direction of the fuel cell 1020.

FIG. 15 shows the form of the fuel cell 1020 seen from the lamination direction. As shown in the drawing, the fuel cell 1020 of this embodiment is formed with the orthogonal direction cross section in a circular shape. The dot-dash lines in the drawing show the positions at which the screw grooves 1037 and 1038 and the screw grooves 1057 and 1067 are mutually fit together. An external manifold 1080 is provided on the outer edge part of the fuel cell 1020. The external manifold 1080 is equipped a manifold connecting in the lamination direction and a hole communicating with the fuel cell 1020 are equipped respectively for fuel gas, oxidation gas, and cooling water (not illustrated). The fuel gas, oxidation gas, and cooling water are supplied and exhausted using this manifold and communication hole with the fuel cell 1020.

Figure 16:
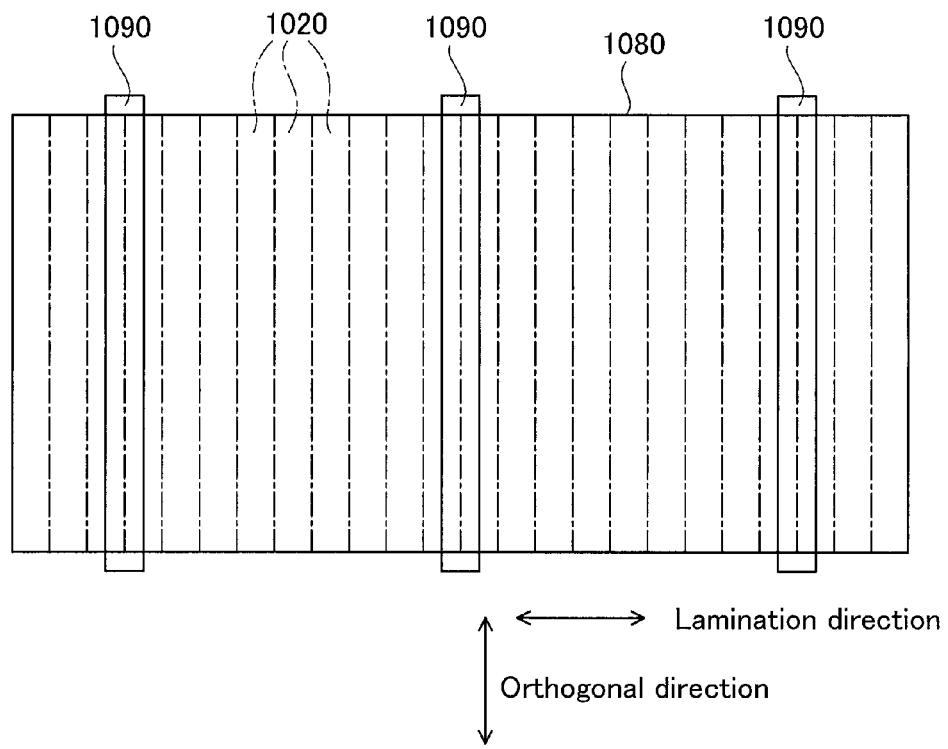
FIG. 16 is an explanatory drawing seen from the direction at which the fuel cell 1020 intersects the lamination direction.

FIG. 16 shows the form of the fuel cell 1020 seen from the orthogonal direction. This drawing shows the state in which a plurality of fuel cells 1020 are laminated. The external manifold 1080 provided in common to the outer edge of the plurality of fuel cells 1020 is clamped facing the inside by a plurality of bands 1090 provided on the outer edge of the external manifold 1080. With this clamping force, the sealing properties of the external manifold 1080 and the fuel cell 1020 are ensured.

With the fuel cell 1020 of this constitution, the convex parts 1032 and 1033 and the recesses 1052 and 1062 are fit together respectively by screw grooves, so the fitting relationship is strengthened, and the sealing properties are improved. Moreover, the fitting relationship of these does not come apart easily, so it is possible to improve the seal reliability. To say this in the opposite way, it is possible to reduce the clamp load of the fuel cell 1020. Furthermore, even if cleaving occurs with the convex parts 1032 and 1033, the fitting relationship does not come apart easily, so the seal durability is improved.

For the specifications (pitch, height, angle and the like) of the screw grooves 1037 and 1038 and the screw grooves 1057 and 1067, the necessary tightening torque is set taking into consideration gas pressure of the reaction gas of the fuel cell 1020, water pressure of the cooling water, pressure receiving surface area of the sealing locations and the like, and setting should be done to ensure the concerned tightening torque. The convex parts 1032 and 1033 can also be constituted to be equipped with a reinforcing material that follows the shape of the screw grooves 1037 and 1038 on the inside near the front surface of the screw grooves 1037 and 1038. Alternatively, it is also possible to constitute this with a reinforcing material following the shape of the screw grooves 1037 and 1038 adhered to the front surface of the screw grooves 1037 and 1038. As the reinforcing material, any item is acceptable provided it has elasticity smaller than that of the electrolyte that is the material of the screw grooves 1037 and 1038. In this way, the shape of the screw grooves 1037 and 1038 becomes strong. As a result, it is possible to improve the sealing properties and durability. It is also possible to increase the degree of freedom for setting the value of the tightening torque.

I. Modification Examples

Modification examples of the embodiments described above will be described.

I-1. Modification Example 1

Figure 17:
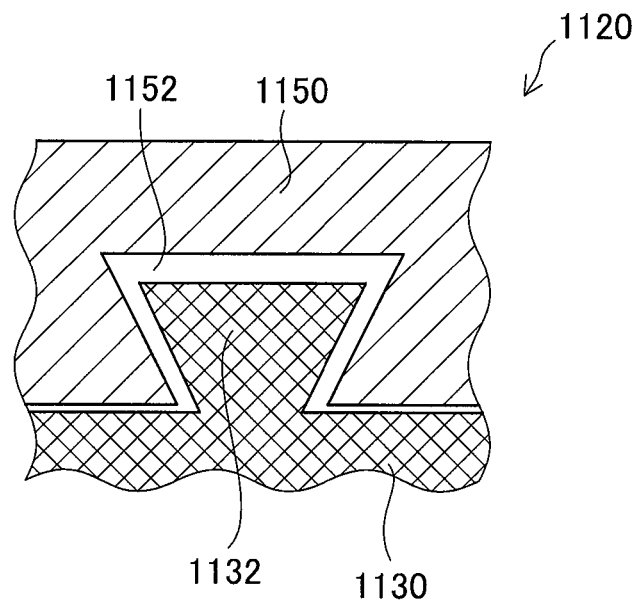
FIG. 17 is an explanatory drawing showing the schematic structure of the fuel cell 1120 as a modification example.

The recess-convex shape that seals between the electrolyte membrane and the separators is not particularly restricted. FIG. 17 shows another example of that recess-convex shape. With this example, the cross section shape of the lamination direction of the convex part 1132 formed on the electrolyte membrane 1130 constituting the fuel cell 1120 is formed in a trapezoid shape that broadens in a reverse taper shape facing the tip part from the attachment base of the convex shape. Also, the cross section shape in the lamination direction of the recess 1152 of the separator 1150 is a shape that follows the shape of the convex part 1132, specifically, is formed in a trapezoid shape for which the cross section area of the opening of the recess shape becomes larger facing the inside from the opening part. With this recess-convex shape as well, the fitting relationship of the convex part 1132 and the recess 1152 is not eliminated easily, so the effects described above are exhibited due to this.

Figure 18:
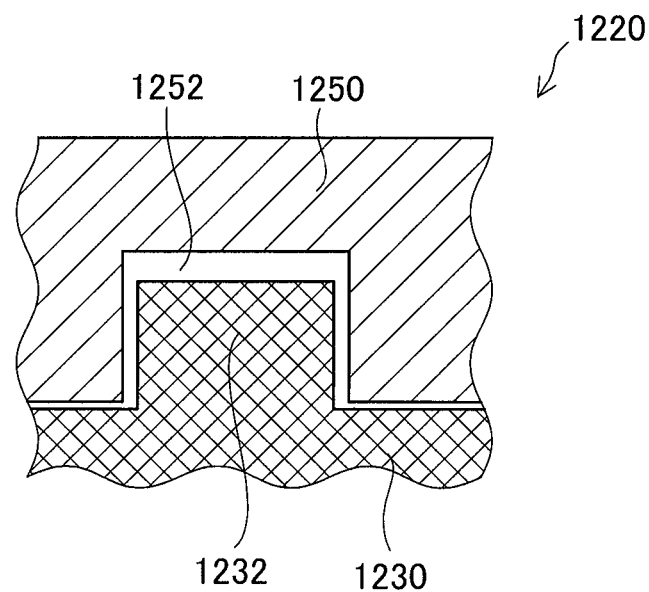
FIG. 18 is an explanatory drawing showing the schematic structure of the fuel cell 1220 as a modification example.

FIG. 18 shows yet another example of this recess-convex shape. With this example, the cross section shape in the lamination direction of the convex part 1232 formed on the electrolyte membrane 1230 constituting the fuel cell 1220 is formed in a rectangle shape. Also, the cross section shape in the lamination direction of the recess 1252 of the separator 1250 is formed in a shape following the shape of the convex part 1232, specifically, a rectangular shape. With this recess-convex shape as well, by the convex part 1232 expanding due to moisture absorption, it is possible to seal in the orthogonal direction, so the effects described above are exhibited due to this.

I-2. Modification Example 2

Figure 19:
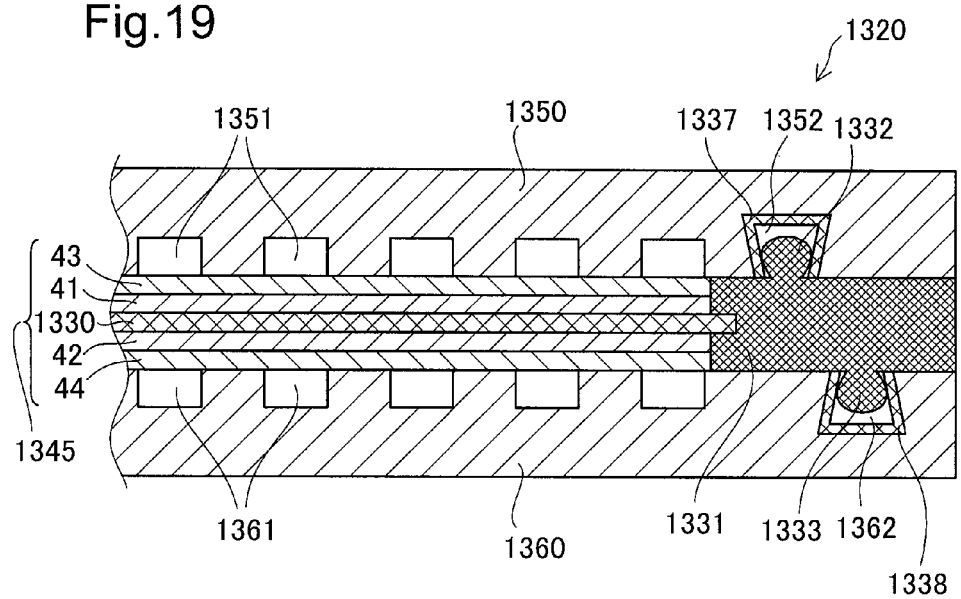
FIG. 19 is an explanatory drawing showing the schematic structure of the fuel cell 1320 as a modification example.

With the embodiments described above, shown were constitutions for which the convex part of the convex part and recess constituting the seal structure was formed using a polymer material having the property of expanding due to moisture absorption. Instead of the convex part, or in addition to it, it is also possible to form the recess using that polymer material. FIG. 19 shows a specific example of that constitution. In FIG. 19, for the same constitutional items as those of the first embodiment (FIG. 1), the same code numbers are given as in FIG. 1. Following, for the fuel cell 1320 as a modification example, a description of the same constitutional items as those of the first embodiment will be omitted, and only the differences from the first embodiment will be described.

The electrolyte membrane 1330 of the MEGA 1345 constituting the fuel cell 1320 has the same thickness as the power generating surface, and extends to the outside further than the power generating surface. The gasket 1331 is arranged on the outer edge part of the MEGA 1345. The end part of the electrolyte membrane 1330 is embedded inside the gasket 1331. Convex parts 1332 and 1333 projecting in the lamination direction are respectively formed on both surfaces in the lamination direction of the gasket 1331. The convex parts 1332 and 1333 are the same material as the gasket 1331 and are formed as an integral unit with the gasket 1331. With this embodiment, the gasket 1331 is butyl rubber. With this embodiment, the MEGA 1345 and the gasket 1331 are formed as an integral unit by forming the gasket 1331 using injection molding on the outer edge part of the MEGA 1345. This MEGA 1345 and the gasket 1331 correlate to the power generating body. The gasket 1331 can also be an electrolyte membrane formed as an integral unit with the electrolyte membrane 1330, the same as with the first embodiment.

Recesses 1352 and 1362 recessed in the lamination direction are respectively formed at positions corresponding to the convex parts 1332 and 1333 on the separators 1350 and 1360 laminated on both surfaces of the lamination surface of the MEGA 1345. Polymer members 1337 and 1338 are respectively joined to the surfaces forming the recesses 1352 and 1362. The polymer members 1337 and 1338 consist of a polymer material having the property of expanding with moisture absorption. With this embodiment, an electrolyte of the same properties as the electrolyte membrane 1330 is used for the polymer members 1337 and 1338. The polymer members 1337 and 1338 are acceptable as long as they are arranged at least at the inside side surfaces of the recesses 1352 and 1362.

Figure 20:
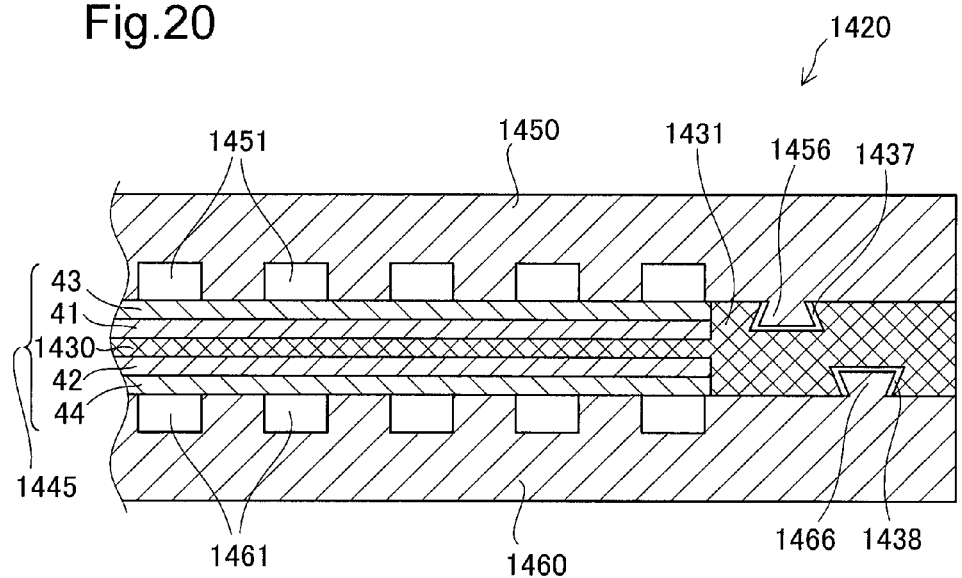
FIG. 20 is an explanatory drawing showing the schematic structure of the fuel cell 1420 as a modification example.

FIG. 20 shows another specific example. In FIG. 20, for constitutional items that are the same as those of the first embodiment (FIG. 1), the same code numbers as in FIG. 1 are given. Following, for a fuel cell 1420 as a modification example, a description will be omitted of constitutional items that are the same as those of the first embodiment, and only the differences from the first embodiment will be described.

The electrolyte membrane 1430 of the MEGA 1445 constituting the fuel cell 1420 is equipped with an outer edge part 1431 formed using the electrolyte as part of the electrolyte membrane 1430 at its outer edge part. Recesses 1437 and 1438 recessed in the lamination direction are respectively formed at both surfaces in the lamination direction of this outer edge part 1431. Also, convex parts 1456 and 1466 projecting in the lamination direction are equipped at positions corresponding to the recesses 1437 and 1438 on the separators 1450 and 1460. The convex parts 1456 and 1466 are formed as part of the separators 1450 and 1460, but it is also possible to have them be items joined with another member. The convex parts 1456 and 1466 and the recesses 1437 and 1438 are fit together, ensuring the seal between the electrolyte membrane 1430 and the separators 1450 and 1460. The recess-convex shape for this seal structure has the shape shown in FIG. 17 in this case. For the recesses 1437 and 1438, when the outer edge part 1431 is equipped with a wave shape, this wave can also be used as the recesses.

I-3. Modification Example 3

The various seal structures described above can of course be used in any combination. For example, it is possible to form both the recess shapes and the convex shapes that perform sealing with a polymer material having the property of expanding due to moisture absorption.

I-4. Modification Example 4

With the embodiments described above, examples were shown for which a seal structure using a recess-convex shape was applied on both surfaces of the lamination surface of the MEGA, but it is also possible to apply this only to one surface.

Above, we described embodiments of the present invention, but of the structural elements of the present invention with the embodiments described above, elements other than the elements noted in the independent claims are additional elements, and may be omitted or combined as appropriate. Also, the present invention is not limited to these kinds of embodiments, and it is of course possible to implement various modes in a scope that does not stray from the gist of the present invention. For example, the present invention is not limited to being the solid polymer type fuel cell shown in the embodiments, and it is possible to apply this to various fuel cells which operate under conditions in which moisture exists as a liquid, for example, to a direct methanol type fuel cell.

INDUSTRIAL APPLICABILITY

The present invention can be applied to various fuel cells that operate under conditions in which moisture exists as a liquid.

REFERENCE SIGNS LIST

20, 120, 220, 420, 520, 620, 720, 820, 920, 1020, 1120, 1220, 1320
Fuel cell
30, 130, 230, 430, 630, 730, 830, 930, 1130, 1230, 1330, 1430
Electrolyte membrane
31,231, 431, 831, 1031, 1431 Outer edge part
32, 232, 432, 632, 732, 832, 932, 1032, 1132, 1232, 1332 Convex part
33, 233, 433, 633, 733, 833, 933, 1033, 1333 Convex part
41 Anode electrode
42 Cathode electrode
43, 44 Gas diffusion layer
45, 145, 245, 445, 645, 745, 845, 945, 1345, 1445 MEGA
50, 150, 250, 550, 650, 1050, 1150, 1250, 1350, 1450 Separator
51, 151, 251, 551, 651, 1351, 1451 Groove part
52, 252, 552, 652, 1052, 1152, 1252, 1352 Recess
60, 160, 260, 560, 660, 1060, 1360, 1460 Separator
61, 161, 261, 561, 661, 1361, 1461 Groove part
62, 262, 562, 662, 1062, 1362 Recess
170 Gasket
175 Convex part
235 Ionomer
471 Internal member
472, 473 Convex shaped part
553, 563 Shape memory member
655, 665 Projecting part
680, 690 Forming die
681, 691 Recess
682, 692 Convex part
737, 738 Support member
931 Polymer member
1037, 1038 Screw groove
1057, 1067 Screw groove
1080 External manifold
1090 Band
1331 Gasket
1337, 1338 Polymer member
1437, 1438 Recess
1456, 1466 Convex part
CP Contact location

The invention claimed is:

1. A fuel cell including a separator and a power generating body, the separator and power generating body being stacked one on top of the other, and the power generating body being equipped at least with an electrolyte membrane, anode and cathode, comprising:

a sealing part that seals reaction gas supplied for electrochemical reactions at the fuel cell between the power generating body and the separator at an outer circumference part of the fuel cell, wherein a convex part and a recess are fit together in the sealing part, the convex part being formed projecting in a stacking direction on one of the power generating body and the separator, and the recess being formed recessed in the stacking direction on the other of the power generating body and the separator, and at least one of the convex part and the recess is formed with a polymer material that expands with moisture absorption, wherein the fuel cell has a gap between a projecting tip of the convex part and a recessed bottom surface of the recess in a state for which the at least one of the convex part and the recess formed using the polymer material has expanded due to moisture absorption.

2. A fuel cell according to claim 1 wherein
the convex part and the recess perform the sealing by contacting at least in a direction intersecting with the stacking direction.

3. A fuel cell according to claim 1 wherein
the convex part has a shape such that at least a part of the convex part further to a tip side has a cross section area in a direction intersecting the stacking direction which is larger than that of a base of the projection of the convex part, and the recess has a shape such that at least a part of the recess further to an inside of the recess from an opening part of the recess has an opening cross section area in the direction intersecting the stacking direction which is larger than that of the opening part of the recess.

4. A fuel cell according to claim 1 wherein
the convex part is formed on the power generating body, and
the recess is formed on the separator.

5. A fuel cell according to claim 4 wherein
the convex part is formed using a polymer material.

6. A fuel cell according to claim 5 wherein
the polymer material is an electrolyte, and
the convex part is formed as an integral unit with the electrolyte membrane using the electrolyte.

7. A fuel cell according to claim 5 further comprising:
an internal member in the convex part, the internal member having an elasticity smaller than that of the polymer material and a shape roughly follows a shape of the convex part.

8. A fuel cell according to claim 7 wherein
the internal member is formed with a shape memory member.

9. A fuel cell according to claim 5 wherein
a shape memory member is joined to a side surface of an inner diameter of the recess of the separator.

10. A fuel cell according to claim 4, wherein
the separators on which recesses are formed is a pair of separators stacked on both surfaces of the power generating body,
at least one of the pair of separators is equipped with a projecting part at a position corresponding to the recess formed on the other separator, the projecting part projecting facing the recess and
the projecting part seals the reaction gas between the one of the separators and the power generating body.

11. A fuel cell according to claim 5 further comprising:
a support member with elasticity smaller than that of the polymer material in the convex part.

12. A fuel cell according to claim 6 further comprising:
a support member with elasticity smaller than that of the polymer material, the support member being arranged at a position at which the convex part is formed, and inside the electrolyte membrane or at a front surface of a surface opposite a surface on which the convex part of the electrolyte membrane is formed.

13. A fuel cell according to claim 1 wherein
mutually fitting screw grooves are formed on a side surface of the convex part and a side surface of the recess.

14. A fuel cell according to claim 1, wherein
the convex parts or the recesses are formed at both surfaces of the power generating body,
the convex parts or the recesses that fit with the recesses or the convex parts are formed at both of the separators stacked at both sides of the power generating body, and
the convex parts or the recesses of the power generating body are formed at a different positions between both surfaces of that power generating body.

15. A fuel cell according to claim 1 wherein
the polymer material is an electrolyte.

16. A method of manufacturing a fuel cell including a separator and a power generating body, the separator and power generating body being stacked one on top of the other, and the power generating body being equipped at least with an electrolyte membrane, anode and cathode, comprising:

first preparing the power generating body having an outer circumference part formed only by the electrolyte membrane, and the separator having a recess that is recessed in relation to a stacked surface on an outer circumference part of the separator, second stacking the power generating body and the separator in a positional relationship for which the outer circumference part of the power generating body and the recess face opposite each other, and third entering the electrolyte membrane into the recess to ensure a seal between the electrolyte membrane and the separator at the recess, by performing at least once an increasing process of a water content of the electrolyte membrane and generating expansion due to moisture absorption of the electrolyte membrane, wherein a gap exists between a projecting tip of a convex part and a recessed bottom surface of the recess.

* * * * *